United States Patent
Rapp et al.

(10) Patent No.: US 8,926,786 B1
(45) Date of Patent: Jan. 6, 2015

(54) COMPOSITE PANEL AND METHOD OF MANUFACTURING THE SAME

(75) Inventors: Robert A. Rapp, O'Fallon, MO (US); James F. Ackermann, Woodinville, WA (US); Gregory R. Gleason, Seattle, WA (US); Ken M. Tanino, Renton, WA (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 13/364,995

(22) Filed: Feb. 2, 2012

Related U.S. Application Data

(63) Continuation of application No. 11/955,959, filed on Dec. 13, 2007, now abandoned.

(51) Int. Cl.
 *B32B 37/00* (2006.01)

(52) U.S. Cl.
 USPC ............. 156/307.1; 156/306.9; 428/116

(58) Field of Classification Search
 CPC ......... B32B 3/12; B32B 37/02; B29D 24/005
 USPC ............. 156/245, 292, 307.1, 307.7, 306.6; 428/116
 See application file for complete search history.

(56) References Cited

U.S. PATENT DOCUMENTS

| | | | |
|---|---|---|---|
| 4,680,216 A | 7/1987 | Jacaruso | |
| 4,687,691 A | 8/1987 | Kay | |
| 5,034,256 A * | 7/1991 | Santiso et al. ............. | 428/73 |
| 5,604,010 A | 2/1997 | Hartz et al. | |
| 5,688,353 A | 11/1997 | Dublinski et al. | |
| 6,180,206 B1 | 1/2001 | Kain, Jr. | |
| 6,284,089 B1 | 9/2001 | Anderson et al. | |
| 6,475,596 B2 | 11/2002 | Hsiao et al. | |
| 6,565,942 B2 | 5/2003 | Anderson et al. | |
| 6,663,737 B2 | 12/2003 | Hsiao et al. | |
| 6,679,969 B1 | 1/2004 | Fournier et al. | |
| 6,692,681 B1 | 2/2004 | Lunde | |
| 2004/0086686 A1 | 5/2004 | Holemans | |
| 2005/0161154 A1 | 7/2005 | Anderson | |
| 2006/0008611 A1 | 1/2006 | Shen et al. | |
| 2007/0101679 A1 | 5/2007 | Harthcock et al. | |

FOREIGN PATENT DOCUMENTS

| | | |
|---|---|---|
| EP | 0786330 A2 | 7/1997 |
| EP | 1308266 A1 | 5/2003 |
| EP | 1897680 A1 | 3/2008 |
| GB | 1338902 | 11/1973 |

OTHER PUBLICATIONS

European Search Report for Application No. 08170902.4-2124; Feb. 11, 2009; 5 pages.

* cited by examiner

*Primary Examiner* — John Goff

(74) *Attorney, Agent, or Firm* — Armstrong Teasdale LLP

(57) ABSTRACT

A method of manufacturing a composite panel is described. The method includes pre-stabilizing a honeycomb core with at least one layer of a pre-stabilizing material, surrounding the honeycomb core with at least one composite laminate skin layer, and curing the at least one composite laminate skin layer.

8 Claims, 3 Drawing Sheets

COMPOSITE PANEL AND METHOD OF MANUFACTURING THE SAME

CROSS REFERENCE TO RELATED APPLICATIONS

This patent application is a continuation application of U.S. patent application Ser. No. 11/955,959 filed on Dec. 13, 2007, now abandoned.

BACKGROUND OF THE INVENTION

This invention relates generally to composite materials, and more specifically to composite panels having a honeycomb core that are manufactured using a single-step curing process.

Honeycomb core sandwich panels include composite laminate skins co-cured with adhesives to a honeycomb core are known. Such panels are utilized, for example, in the aerospace industry. Such honeycomb core sandwich panels are used at least partially due to their high stiffness-to-weight (i.e., specific stiffness) and strength-to-weight (i.e., specific strength) ratios. Current sandwich panels are processed, for example, using multiple cure cycles, or are co-cured in one step at low cure pressures in order to prevent deformation of the honeycomb core.

When multiple cure cycles are used, either one or both of the composite skins are precured, then later bonded or cobonded onto the honeycomb core and/or the other skin. The multiple and complex steps increase production expenses and also increase the risk of defective panels due to, for example, bondline discrepancies, since the precured skin must match very closely with the contour-machined honeycomb core surface.

A co-cure process refers to more than one skin simultaneously cured and bonded onto the machined honeycomb core pieces. A skin may include one ply of a composite material or a plurality of plies of a composite material. Numerous quality issues typically occur with a co-cure process such as, for example, distortion of the composite plies and/or dispersion of the composite resin into cells of the honeycomb core, as well as distortion of cells of the honeycomb core from their pre-processed core cell shape. Other quality issues due to known co-cure processes may also include formation of porous composite skins caused by curing at a less than optimum pressure, and also due to distortion of the composite skins into the cells of the core.

Furthermore, quality inspections of composite panels formed using known co-cure processes are complicated because it may be difficult to accurately assess the quality of a composite panel formed using a known co-cure process using typical non-destructive inspection techniques, such as ultrasonic inspection methods.

There are no current composite/honeycomb sandwich design and process schemes in which a one-step co-cure process produces a high strength structural part, with substantially porosity-free composite skins, minimal resin leakage into the honeycomb core, minimal honeycomb core distortion, minimal composite ply distortion into the honeycomb cells, and having composite skins that may be readily inspected by known ultrasonic inspection techniques to verify the co-cured skins are substantially porosity-free.

BRIEF DESCRIPTION OF THE INVENTION

In one embodiment, a method of manufacturing a composite panel is provided. The method includes pre-stabilizing a honeycomb core with at least one layer of a pre-stabilizing material, surrounding the honeycomb core with at least one composite laminate skin layer, and curing the at least one composite laminate skin layer.

In another embodiment, a composite panel including a pre-stabilized honeycomb core and at least one laminate skin is provided. The pre-stabilized honeycomb core is surrounded by a pre-stabilizing material. The laminate skin is positioned to surround the pre-stabilized honeycomb core.

DETAILED DESCRIPTION OF THE INVENTION

Figure 1:
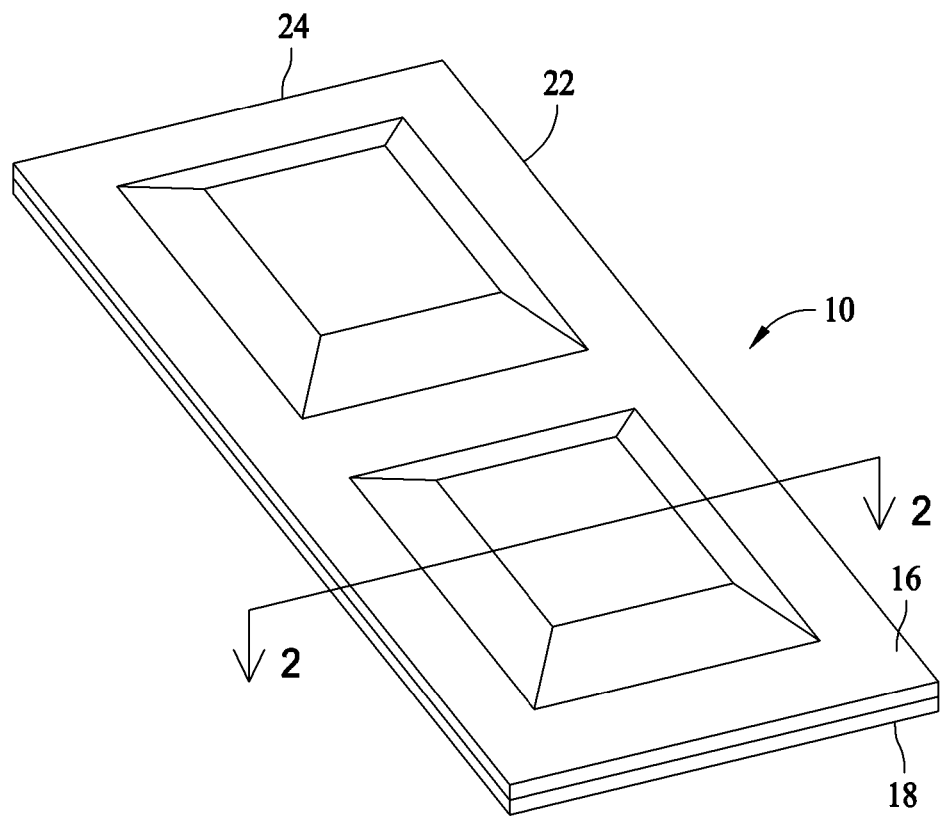
FIG. 1 is an illustration of an exemplary composite panel 10.

FIG. 1 is an illustration of an exemplary composite panel 10. Exemplary composite panel 10 is a sandwich structure that includes two core portions (not shown in FIG. 1), positioned between, and surrounded by, two layers of composite laminate skin, a first layer 16 and a second layer 18. In the exemplary embodiment, first laminate skin layer 16 and second laminate skin layer 18 may be two separate sheets of composite material. In an alternative embodiment, first laminate skin layer 16 and second laminate skin layer 18 are formed from one sheet of composite material, and folded along an edge, for example, but not limited to an edge 22 or an edge 24, such that first layer 16 is adjacent to one side of the core portions (not shown in FIG. 1) and second layer 18 is adjacent to an opposite side of the core portions (not shown in FIG. 1).

Figure 2:
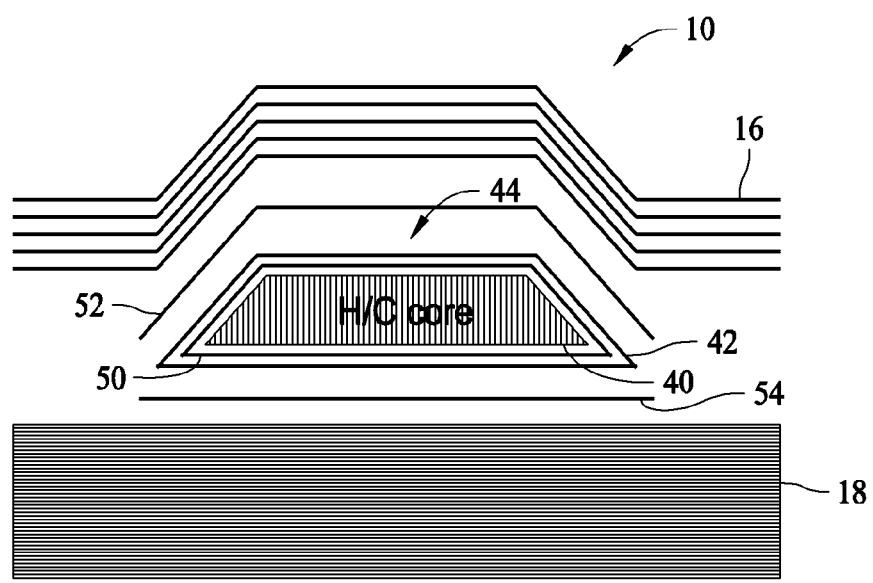
FIG. 2 is a cross-sectional view of the exemplary composite panel of FIG. 1 taken generally along line 2-2.

FIG. 2 is a cross-sectional view of exemplary composite panel 10 taken generally along line 2-2. As described above, composite panel 10 includes at least one core section 40, a pre-stabilizing composite material 42, and first and second composite laminate layers 16 and 18. Examples of composite materials may include, but are not limited to, fiberglass and carbon fiber in a resin matrix.

Core section 40 may be, for example, a honeycomb structure. Core section 40 may be formed from, for example, but not limited to, paper, synthetic paper (e.g., NOMEX® brand fiber, manufactured by E.I du Pont de Nemours and Company), metal, composite, fiberglass, or the like, or any material that enables composite panel 10 to function as described herein. For example, core section 40 may be a chamfered-edge honeycomb core having a density of 3-8 pounds per cubic foot. In the exemplary embodiment, core section 40 is pre-stabilized with pre-stabilizing composite material 42, resulting in a pre-stabilized core 44. More specifically, core section 40 may be pre-stabilized by coupling composite material 42, such as, but not limited to, a ply of preimpregnated fiberglass, to core section 40. In the exemplary embodiment, composite material 42 is coupled to core section 40 using an adhesive 50, such as, but not limited to, a film adhesive, and curing by heating. In an alternative embodiment, composite material 42 is coupled directly to core section 40.

First laminate skin layer 16 and second laminate skin layer 18 may include, but are not limited to including, composite laminate materials such as carbon fiber or fiberglass. First laminate skin layer 16 and second laminate skin layer 18 may be coupled to pre-stabilized core section 40 by respective adhesive layers 52 and 54.

Figure 3:
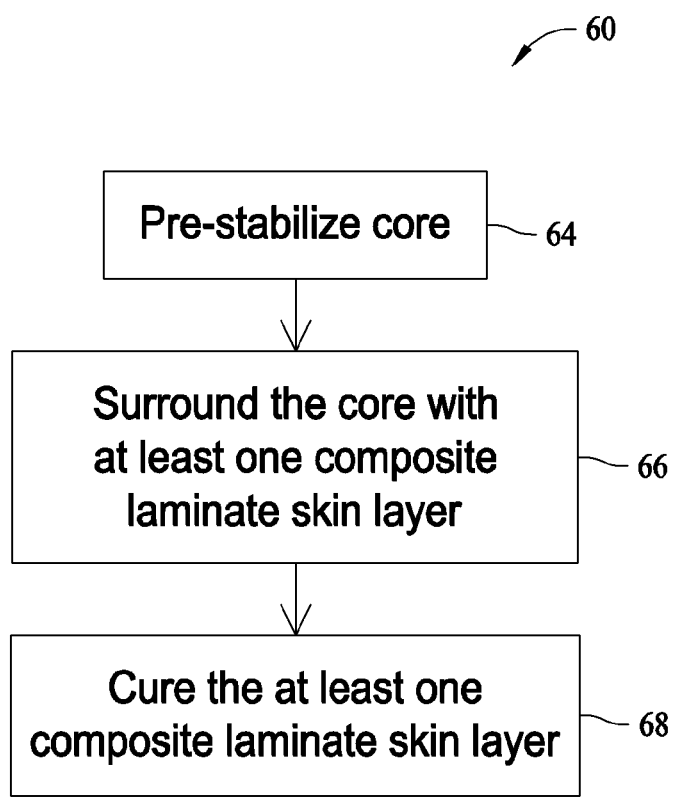
FIG. 3 is a flow chart illustrating an exemplary method of manufacturing the composite panel of FIGS. 1 and 2.

FIG. 3 is a flow chart 60 illustrating an exemplary method of manufacturing the composite panel 10 illustrated in FIGS. 1 and 2. The method includes pre-stabilizing 64 a core. In the exemplary embodiment, pre-stabilizing 64 includes applying a pre-stabilizing composite material to the core and curing the pre-stabilizing composite material in an oven cure cycle under a pressure. The pressure may be applied using, for example, but not limited to, a vacuum bag or an autoclave. Pre-stabilizing 64 increases the strength of the core section 40 without substantially increasing its weight. In the exemplary embodiment, the core is machined to a desired shape and size prior to pre-stabilizing 64. In an alternative embodiment, the core is formed into a desired shape during pre-stabilizing 64. The applied heat facilitates changing the shape of the core and the pre-stabilizing composite material maintains the desired shape of the core.

The method further includes positioning 66 the pre-stabilized core adjacent to at least a first skin layer and a second skin layer. As described above in regard to FIG. 1, laminate skin layer 16 and laminate skin layer 18 may be formed from two separate sheets of composite material. In an alternative embodiment, laminate skin layer 16 and laminate skin layer 18 are formed from one sheet of composite material, and folded along an edge, for example, but not limited to edge 22 or edge 24, such that skin layer 16 is adjacent to one side of the cores and skin layer 18 is adjacent to an opposite side of the cores.

Additionally, the method still further includes curing 68 the first skin layer 16 and the second skin layer 18 substantially simultaneously. In the exemplary embodiment, curing 68 is a high pressure (e.g., 50-120 psi), one-step co-cure process which cures both first skin layer 16 and second skin layer 18 while simultaneously bonding first skin layer 16 and second skin layer 18 to a core, for example, core section 40.

In the exemplary embodiment, curing 68 enables production of cured skins including high-strength composite materials. Curing process 68, and more specifically the high pressure curing that is facilitated by pre-stabilizing the core, results in cured skins having a substantially low porosity, for example, a porosity of less than 2%, which is one indication of high structural performance and of a high level of quality. Curing 68 also enables production of cured skins that are inspectable by known non-destructive inspection techniques, including, but not limited to, ultrasonic inspection techniques. In the exemplary embodiment, the inspection techniques have a resolution sufficient to quantify the porosity of the cured skins.

Furthermore, curing 68 and pre-stabilizing 64 facilitate prevention of core distortion and prevention of resin from the skins intruding into the core during the cure. Pre-stabilizing 64 enables a composite panel to include a light-weight core while also being cured at a high pressure, without the core being distorted. Curing 68 at a high pressure produces skins having a low porosity.

The methods and apparatus described herein facilitate a one-step co-cure process which results in a high strength structural part, that includes substantially porosity-free composite skins, substantially no resin leakage into the honeycomb core, substantially no honeycomb core distortion, substantially no composite ply distortion into the honeycomb cells, while the sandwich skins are readily inspectable by known ultrasonic inspection techniques to verify the co-cured skins are substantially porosity-free.

The methods and apparatus described herein facilitate cost-effective manufacturing of high strength toughened carbon/epoxy composites. Specifically, the methods and apparatus described herein facilitate increasing structural performance of composite panels, minimizing weight, improving part quality inspectability, while minimizing manufacturing cost (in part due to the one-step co-cure process described above).

Exemplary embodiments of composite panels and methods of manufacturing composite panels are described above in detail. Neither the composite panels nor the methods of manufacturing the composite panels are limited to the specific embodiments described herein. Each component can also be used in combination with other components. More specifically, although the methods and apparatus herein are described with respect to aircraft components, it should be appreciated that the methods and apparatus can also be applied to a wide variety of components used within other structures, including, but not limited to, spacecraft, watercraft, and automobiles.

While the invention has been described in terms of various specific embodiments, those skilled in the art will recognize that the invention can be practiced with modification within the spirit and scope of the claims.

What is claimed is:

1. A method of manufacturing a composite panel, said method comprising:
   forming a honeycomb core into a desired shape and size before pre-stabilization of the honeycomb core;
   pre-stabilizing the honeycomb core by curing at least one layer of a pre-stabilizing material about the honeycomb core at a pressure and a temperature that facilitates the honeycomb core being maintained in the desired shape and size, wherein the at least one layer of a pre-stabilizing material is coupled to a core section using a film adhesive and applying a first pressure to said core section and said at least one layer of pre-stabilizing material;
   surrounding said pre-stabilized honeycomb core with at least one composite laminate skin layer; and
   curing said at least one composite laminate skin layer and said honeycomb core by applying a second pressure to said honeycomb core and said at least one composite laminate skin layer, wherein said second pressure is at least 51 pounds per square inch (psi).

2. A method according to claim 1 wherein pre-stabilizing said honeycomb core comprises applying at least one layer of pre-stabilizing material to said honeycomb core, such that said at least one layer of pre-stabilizing material substantially surrounds said honeycomb core.

3. A method according to claim 2 wherein applying at least one layer of pre-stabilizing material comprises applying at least one layer of composite material.

4. A method according to claim 3 wherein said composite material comprises at least one layer of a fiberglass fabric.

5. A method according to claim 1, wherein forming a honeycomb core comprises machining said honeycomb core to the desired shape and size.

6. A method according to claim 1 wherein surrounding said honeycomb core with at least one composite laminate skin layer comprises positioning said honeycomb core adjacent to a first composite skin and positioning a second composite skin adjacent to an opposite side of said honeycomb core.

7. A method according to claim 1 wherein surrounding said honeycomb core with at least one composite laminate skin layer comprises positioning said honeycomb core adjacent to a first composite skin and folding said first composite skin over said honeycomb core.

8. A method according to claim 1 wherein curing said at least one composite laminate skin comprises heating said at least one composite laminate skin layer while applying said second pressure that is higher than a pressure that can be applied to composite panels that do not include a pre-stabilized honeycomb core.

* * * * *